Oct. 1, 1963
J. L. MILANOS ETAL
3,105,320
DISPENSER
Filed Aug. 5, 1960
3 Sheets-Sheet 1
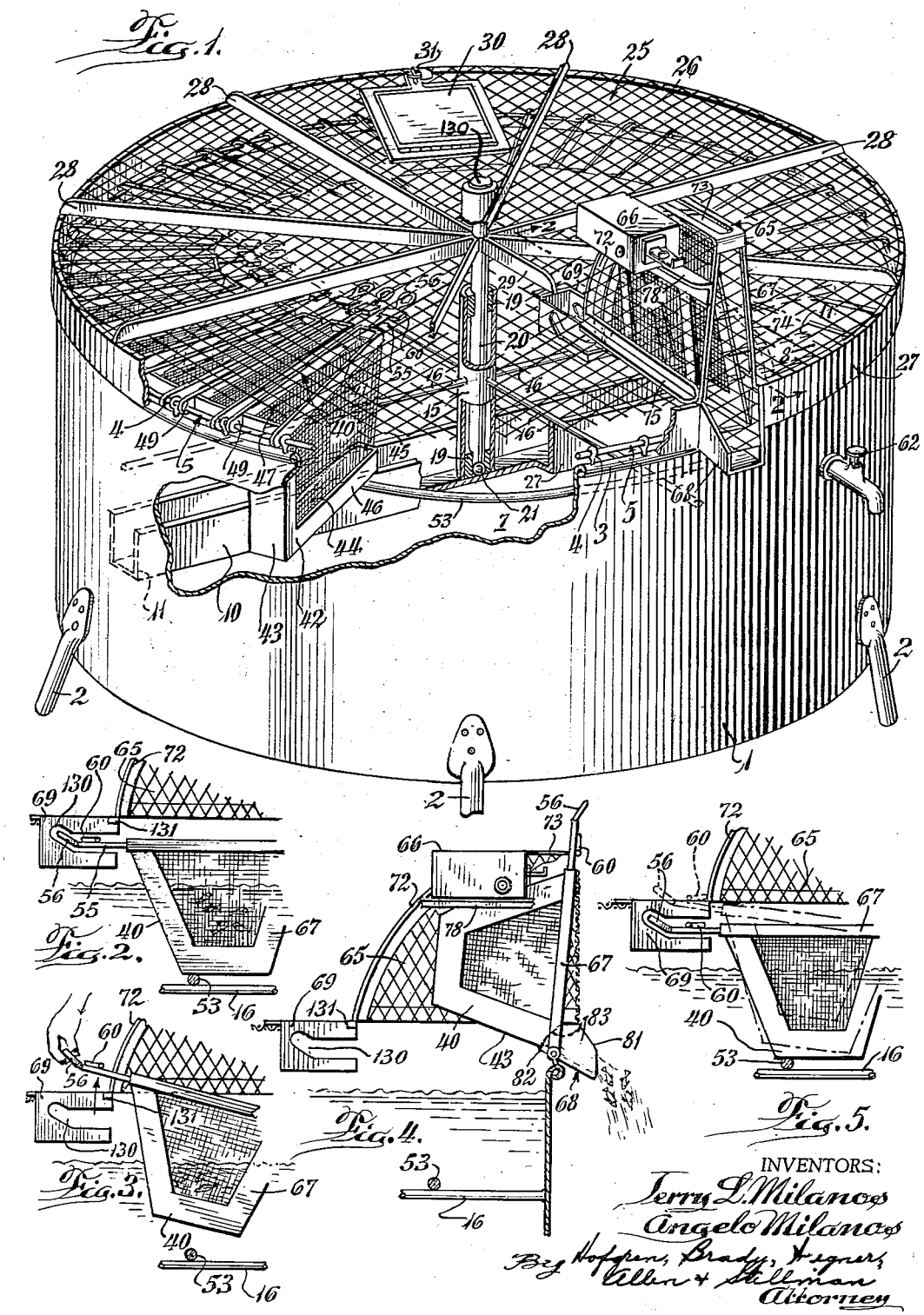
INVENTORS:
Jerry L. Milanos
Angelo Milanos
By Hofgren, Brady, Wegner,
Allen & Stellman
Attorneys Oct. 1, 1963   J. L. MILANOS ETAL   3,105,320
DISPENSER
Filed Aug. 5, 1960   3 Sheets-Sheet 2
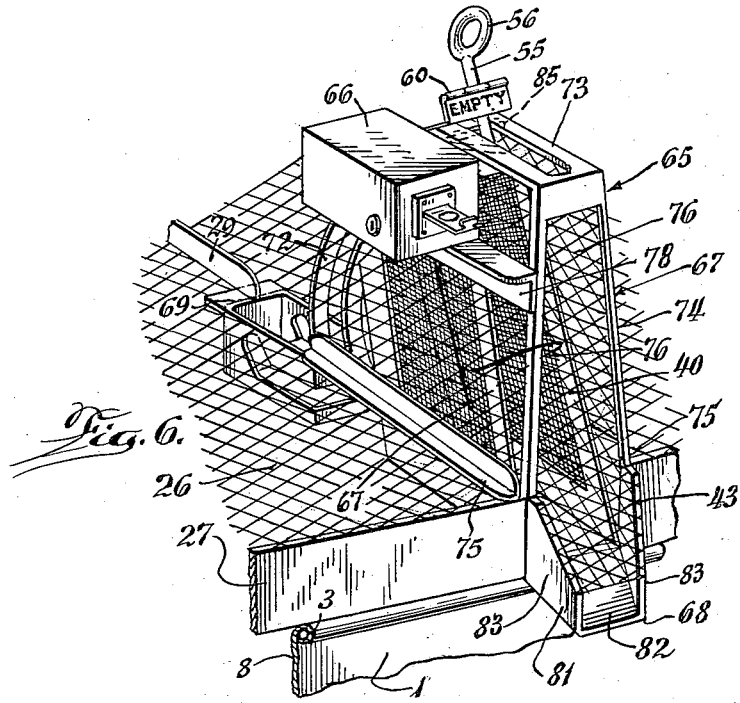
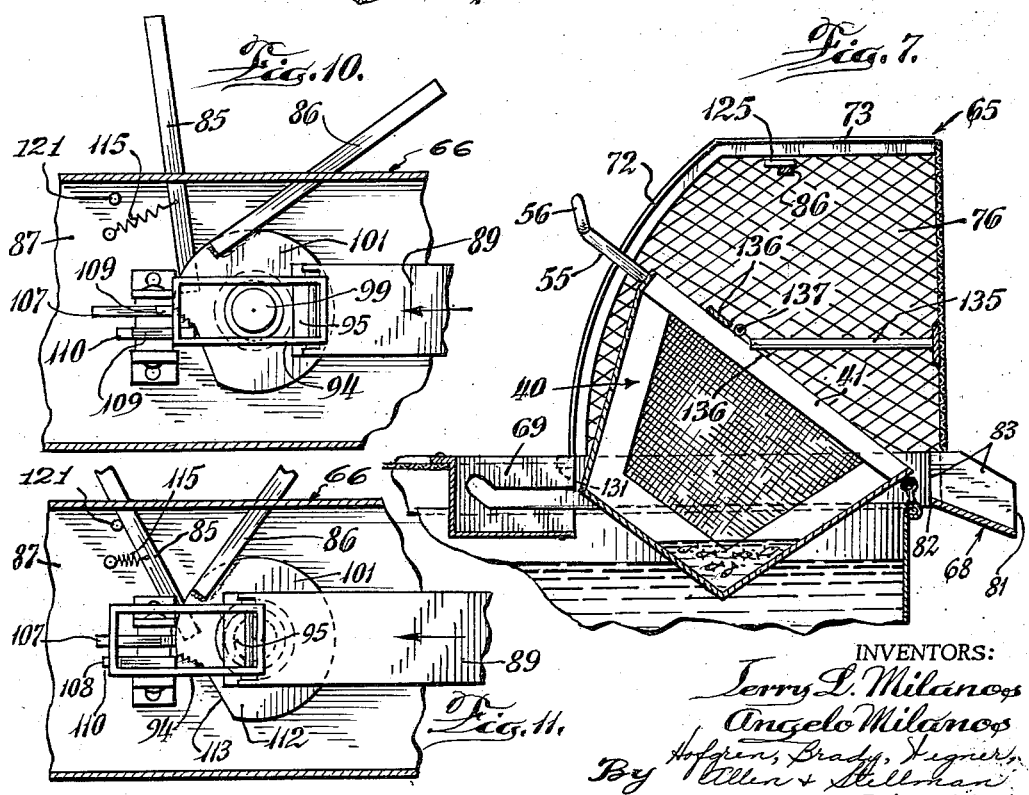
INVENTORS:
Jerry L. Milanos
Angelo Milanos
By Hofgren, Brady, Wegner,
Allen & Stellman
Attorney

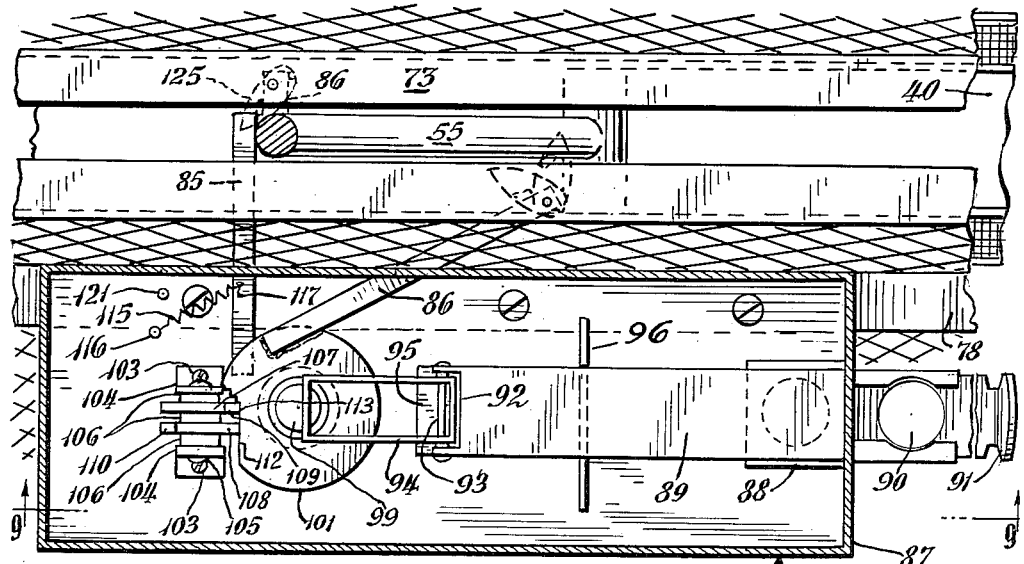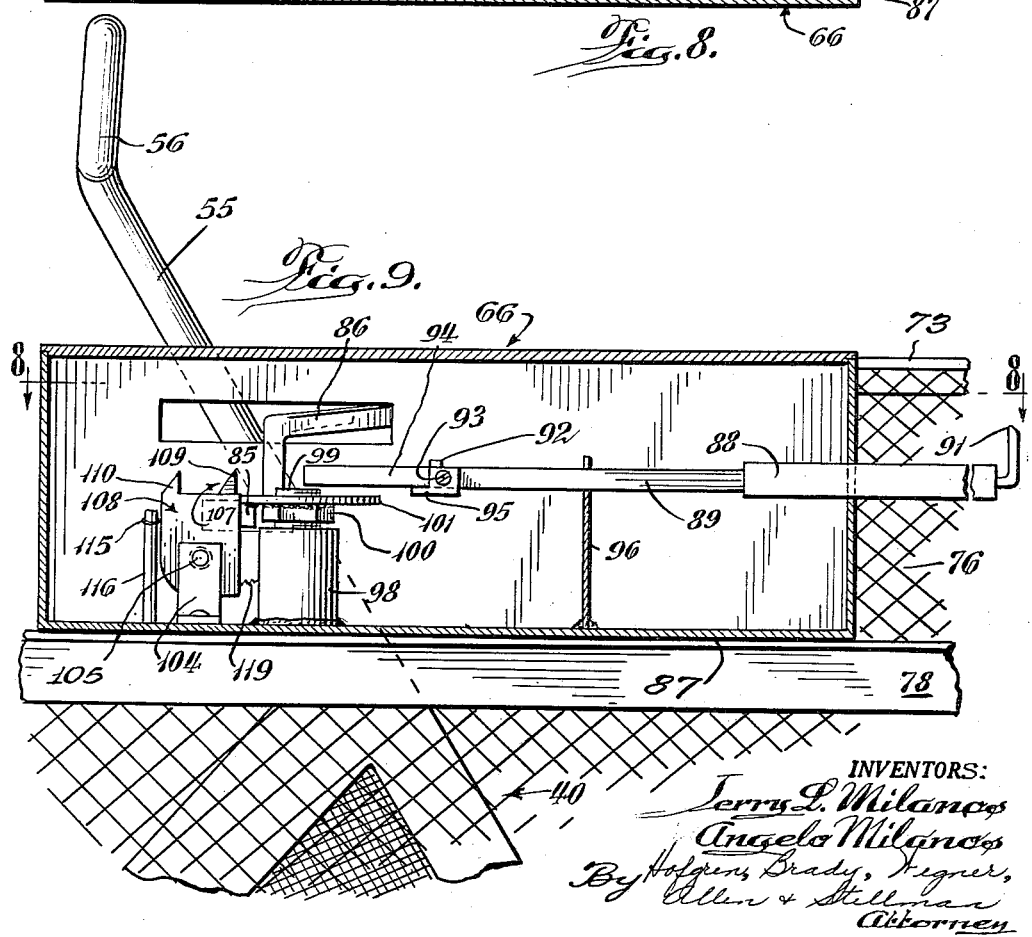

United States Patent Office
3,105,320
Patented Oct. 1, 1963

3,105,320
DISPENSER
Jerry L. Milanos and Angelo Milanos, both of 203 W. Water St., Hillsboro, Ill.
Filed Aug. 5, 1960, Ser. No. 47,859
17 Claims. (Cl. 43—56)

This invention relates to dispensers, and more particularly to dispensers and components thereof for live aquatic animals such as minnows and the like.

Previously proposed devices for dispensing live aquatic animals, and particularly fishing bait, have generally been impractical in that they are too large for the quantity of bait they can hold, and are too complicated in design resulting in an unduly high initial cost and a prohibitive maintenance cost. In addition, most prior devices did not permit a selection of different units of bait and this is desirable so that the fisherman can select the size and type of bait which he desires.

It is therefore an object of this invention to provide an improved dispensing device and particularly such a device for dispensing live aquatic animals;

Another object of this invention is to provide an improved live bait dispensing device which is simple in design and operation;

Still another object of this invention is to provide an improved coin operated dispensing device;

A further object of this invention is to provide an improved indicator and stop mechanism for a dispensing device;

Additional objects and advantages of this invention will be apparent from the following description and drawings, in which:

FIGURE 1 is a broken away perspective view, with parts removed, of an embodiment of the invention.

FIGURE 2 is a fragmentary side view of a portion of the dispenser, and illustrating a bait basket in the normal position prior to dispensing of the bait;

FIGURE 3 is a fragmentary side view similar to FIGURE 2, but illustrating the basket partially raised from the normal position in preparation for dispensing of the bait;

FIGURE 4 is a fragmentary side view similar to FIGURES 2 and 3, but illustrating the bait being dispensed from the basket;

FIGURE 5 is a fragmentary side view similar to FIGURES 2-4, but illustrating the basket returning to the normal position after the bait has been dispensed therefrom;

FIGURE 6 is a fragmentary perspective view illustrating an empty basket in the normal position prior to inserting a coin in a coin device preparatory to selecting a full basket;

FIGURE 7 is a fragmentary sectional view of another embodiment of the invention illustrating a full basket being moved to dispensing position;

FIGURE 8 is a fragmentary sectional plan view of an embodiment of a coin latch mechanism prior to insertion of a coin, and taken on the line 8—8 in FIGURE 9;

FIGURE 9 is a sectional elevation view taken on the line 9—9 in FIGURE 8;

FIGURE 10 is a fragmentary sectional plan view similar to FIGURE 8, but showing the latch mechanism during a preliminary releasing stage; and FIGURE 11 is a fragmentary sectional plan view similar to FIG. 10, but showing the latching mechanism fully released.

Referring to FIGURE 1, the dispensing device is shown in an intermediate position preparatory to the selection and emptying of a unit of bait. A cylindrical tank 1 is supported by legs 2 secured to the tank in any conventional manner as by rivets or welding. The tank 1 has an open upper end defined by a peripheral edge 3. Secured to the peripheral edge 3 in any conventional manner as by welding, are a plurality of eyes 4, each eye receiving a portion of a circular rod 5. The tank has a bottom 7 and a vertical cylindrical side wall 8. A channel iron is spaced from the tank bottom 7 and fixed at both ends 11 to the inner surface of the tank side wall 8 in any conventional manner, as by welding. The channel member 10 is diametrically positioned within the tank 1 and at the center of the channel member 10 is an upwardly and vertically projecting tube 15. The tube is fixed to the channel member 10 in a conventional manner such as by welding. Lateral support for the tube 15 is provided by horizontally extending radial braces 16, welded, or otherwise fixed to the pipe and to the side wall 8 of the tank. Adjacent the ends of the pipe 15 are a pair of bushings 19 which rotatably receive a vertical post 20. The bottom of the post 20 engages in a ball bearing 21 which rests against the channel member 10 within the lower bushing 19. Secured to the upper end of the post 20 is a closure 25 which along with the tank defines a covered receptacle.

The preferred embodiment of the closure comprises a wire mesh 26 secured to a circular ring 27 and to a plurality of radially disposed spokes 28, each of the spokes being fixed at their opposite ends, as by welding or the like, to the upper peripheral edge of the ring 27 and to the post 20. The bottom edge of the ring 27 is closely spaced from the peripheral edge 3 of the tank and may lightly engage the peripheral edge. The ring 27 prevents anyone from reaching into the tank 1 through the space between the bottom of the ring 27 and the tank peripheral edge 3. The wire mesh 26 may be secured to the spokes in any conventional manner as by welding or braising, or the mesh may be wired to the spokes. A hinged door 30 is provided in the closure mesh 26 to permit servicing the dispenser and may be locked shut as by a hasp and padlock 31.

Within the tank 1 are a plurality of containers in the form of perforate baskets 40. A portion of the baskets are removed for purposes of illustration. In the preferred embodiment each basket comprises a U-shaped upper rim 41 fixed as by welding to an L-shaped base 42. The base 42 includes a solid front wall 43, a solid bottom 44, a rear wall 45 and cooperating oppositely disposed side walls 46. Between the upper rim 41 and the side walls 46 is secured, as by welding, a wire mesh to define a basket having an open interior area 47. The free ends of the U-shaped upper rim 41 have extensions 49 each provided with a hole which receives the circular rod 5 so that each basket 40 is pivoted on the rod. Adjacent baskets are maintained spaced from each other by the eyes 4. When a basket is in the normal position it is maintained in a substantially horizontal position by the rear end thereof resting on a circular bar 53, welded or otherwise fixed to the top of the braces 16. Secured to the bight portion of the U-shaped upper rim 41 is a generally horizontal arm 55 having an eye 56 at its outer end. An indicator 60 is pivoted to the upper side of the arm 55 as will be more fully described hereinafter. A water tap 62 may be provided in the tank side wall 8 and should be positioned sufficiently high so that water may be removed from the tank 1 only to a safe level for maintaining the bait in adequate water. The purpose of the water tap 62 is to permit the fisherman who is purchasing bait to also take some water in which to keep the bait.

The front wall 43 of each basket as well as the bottom 44 of each basket are preferably smooth and imperforate to prevent damage to the live bait as they are being poured from the basket 40. Since these surfaces support the weight of the bait during the dispensing operation, perforations or a wire mesh might tend to catch and thereby injure the bait. It should also be noted that when the baskets are in the normal position as indicated in FIGURE 1 the top edge of each basket is slightly above the top of the peripheral edge 3 of the tank. Therefore, should the tank 1 become completely filled with water, as during a heavy downpour, the live bait within each basket 40 would continue to be confined within the basket because of the narrow portion of the basket protruding from the surface of the water.

It should be noted that the closure 25 rotates with respect to the tank 1 and with respect to the baskets 40. The closure may be fabricated of any suitable material, and in lieu of the preferred wire mesh 26 a transparent plastic covering, or the like, may be provided. The closure 26 prevents a person from reaching into the tank and aids in preventing foreign matter from entering the tank. The closure 25 is provided with a dispensing portion 65 which includes a coin operated latch mechanism 66 secured to a cage 67 which is of sufficient size to accommodate only one basket 40, a dispensing spout 68, and a hand frame 69.

Referring to FIGURE 6, the cage 67 further includes an arcuate slotted portion 72 joining a slotted top portion 73, and an opening defined by an inverted U-shaped member 74. On either side of the cage 67, and secured to the cover mesh 26, to the circular rim 27, and to the frame 69, as by welding or the like, are a pair of angle members 75. The side walls of the cage 67 are closed by mesh 76, similar to the mesh 26, and secured to members 72, 73, 74 and 75. The coin operated latch mechanism 66 is fixed to an angle member 78 which is in turn fixed to the side of the cage 67. The dispensing spout 68 comprises a U-shaped member 81 in which the bight 82 or bottom of the spout extends rearwardly under the front wall 43 of the cage base, when the cage is in the dispensing position, as may best be seen in FIGURE 4. The purpose of the extension on bight portion 82 is to prevent the live bait from falling back into the tank 1 when the basket 40 is in the dispensing position. Side walls 83 of the dispensing spout may also project rearwardly, if desired, as indicated by the dotted lines in FIGURE 4.

The coin operated latch mechanism 66 is shown in detail in FIGURES 8 through 11. The latch mechanism is secured to angle member 78. As shown in FIGURES 8 and 9, the arm 55 of an empty basket 40 is received in the slot in member 73 and is resting against a stop-arm 85 of the latch mechanism 66. A cocking arm 86 of the latch mechanism is clear of the slot in member 73. The latch mechanism 66 includes a box 87 which is fixed to the angle member 78. A guide 88 is fixed to the box 87 and receives an actuating bar 89 having a socket or hole 90 for receiving a coin, and a handle 91 for pushing the actuating bar into the box 87 after depositing a coin in the hole 90. The portion of the coin mechanism including the guide, actuating bar, coin slot and handle, as previously described is of a conventional nature as is well understood in the art.

An inner end of the actuating bar 89 has a bifurcated portion 92 with fingers having holes each receiving an end of a pivot pin 93. Loosely mounted and freely pivotable on the pin 93 is a rectangular frame 94. Fixed to the bottom of the actuating bar 89 adjacent the forked portion 92 is a rest 95 receiving the frame 94 and limiting downward pivotable movement of the frame. A guide 96 supports the actuating bar 89. Fixed to the bottom of the box 87 as by welding or the like, is a stud 98 having a reduced upper threaded portion 99. The threaded portion threadably receives a nut 100. Fixed to the nut 100, as by welding or the like, is a disk 101. Thus, the disk 101 is rotatable on the stud 98, and is also adjustable vertically because of the threaded connection to the stud. The arms 85 and 86 are each fixed to the disk 101 as by welding or the like. Fixed to the bottom of the box 87 by bolts 103 are upstanding brackets 104. A pivot pin 105 passes through the brackets 104 and through washers 106 and catches 107 and 108, pivotably mounting the catches with respect to the box 87. The catch 107 has an upstanding pawl 109 positioned forwardly with respect to an upstanding pawl 110 on catch 108. In the position shown in FIGURE 8, forward vertical edges of catches 107 and 108 both engage a flat portion 112 of disk 101, and catch 107 engages an offset 113 in the disk, thus preventing counterclockwise rotation of the disk. The disk is constantly urged in a counterclockwise direction by a spring 115 secured to a post 116 which is fixed to the bottom of the box 87, and to a hole 117 in stop arm 85. The catches 107 and 108 are constantly urged into engagement with the disk 101 by compression springs 119 each received between the stud 98 and one of the catches.

The operation of the coin-operated latch mechanism 66 is as follows: When a coin is inserted in hole 90 and handle 91 is pushed inwardly, the rectangular frame 94 moves inwardly and engages upstanding pawl 109 on catch 107. Further inward movement of handle 91 causes catch 107 to rotate counterclockwise (FIGURE 9) disengaging catch 107 from offset 113 in disk 101, thus permitting the disk to rotate counterclockwise until offset 113 engages catch 108. The arms 85 and 86, and the disk 101, are urged counterclockwise both by spring 115 and by the weight of basket 40 applied to stop arm 85 through arm 55. When offset 113 engages catch 108, stop arm 85 has not rotated counterclockwise sufficiently far to permit basket arm 55 to clear the end of stop arm 85 and fall back into the tank. As handle 91 is moved inwardly farther, rectangular frame 94 engages upstanding pawl 110 on catch 108 and rotates catch 108 counterclockwise and out of engagement with offset 113 permitting the weight of the basket and spring 115 to rotate stop arm 85 counterclockwise into engagement with a stop 121 fixed to the bottom of box 87. In this position arm 55 in the slot of slotted member 73 clears the outer end of stop arm 85 and the empty basket 40 falls back into the tank to the position shown in FIGURE 5. When the rectangular frame 94 has moved inwardly far enough to rotate catch 108, catch 107 is within the frame 94 and engages the circular portion of disk 101. Therefore, should be handle 91 be pushed inwardly just sufficiently far to disengage catch 108 from offset 113, clockwise movement of the disk 101 as would occur responsive to drawing a basket past cocking arm 86 and into the dispensing position, will again engage catch 107 in offset 113, eliminating the possibility of more than one basket 40 being emptied upon the insertion of a single coin. When the arm 55 of a basket is now pulled up through the slot in member 73, the basket arm 55 engages the left hand cocking arm 86 which is disposed in the dotted position illustrated in FIGURE 8.

Additional upward movement of the arm 55 causes the cocking arm 86 to be rotated clockwise until the catches 107 and 108 are again in the position illustrated in FIGURE 8. A pivoted tab 125 on the end of cocking arm 86 is engaged by the basket arm 55 as the basket is drawn into the dispensing position thus fully rotating the cocking arm 86 into the position shown by the solid lines in FIGURE 8. When the tab 125 is in the position shown in phantom lines in FIGURE 8, the basket arm 55 will have passed by the tab 125, having rotated the cocking arm 86 clockwise past the normal position shown in FIGURE 8, and after the passage of the basket arm 55 the cocking arm will rotate counterclockwise slightly until the offset 113 engages catch 107. After the bait has been dispensed from basket 40, the basket falls back against stop arm 85, to the original position as illustrated in FIGURE 8, and the basket rotates the tab 125 counterclockwise in passing the end of cocking arm 86.

With particular reference to FIGURE 10, the rectangular frame 94 is shown having rotated catch 107 counterclockwise, but has not as yet engaged upstanding pawl 110 on catch 109. In FIGURE 11 both catches have been disengaged from offset 113 and the disk 101 and arms 85 and 86 have rotated counterclockwise the full extent permitting the empty basket to fall back into the tank. In FIGURE 11, the frame 94 has passed by the pawl 110 permitting the catch 108 to rotate clockwise into engagement with disk 101 in preparation for a full basket to be drawn through slotted member 73 and into the dispensing position, as previously described.

After a coin has been inserted in hole 90 and the handle 91 has pushed inwardly the full amount, the empty basket 40 in cage 65 falls back into the tank and the closure is now freely rotatable with respect to the tank 1, as is illustrated in FIGURE 1. The dispensing cage may now be rotated until it is directly over a desired full basket 40. The purchaser then reaches a hand through the opening defined by hand frame 69, grasps the eye 56 on the basket arm 55 and pulls the full basket 40 upwardly into the dispensing position. As the full basket 40 moves into the dispensing position the arm 55 engages the cocking arm 86 and causes the arm to rotate clockwise from the position shown in FIGURE 11 to the position shown in FIGURE 8. After the live bait has been dispensed from the basket 40 as illustrated in FIGURE 4, and the eye 56 has been released the basket will swing inwardly until the arm 55 again engages the stop arm 85.

Referring to FIGURES 2 through 5, the operation of the indicator 60 is illustrated, as well as the general dispensing function and operation of the device. In FIGURE 2 a full basket 40 is in the normal position and is resting against the support ring 53. It should be noted that the basket arm 55 and gripping eye 56 may pass freely through a slot 130 in the frame 69. In FIGURES 2 and 3 the indicator 60 is in the position indicating that the basket 40 is full of bait. As illustrated in FIGURE 3, the indicator 60 remains in the full position when the buyer grasps the eye 56 and proceeds to pivot the basket 40 into the dispensing position. In FIGURE 4 the basket has moved to the dispensing position, the bait is poured out through the spout 68 and the indicator 60 rotates by gravity into the empty position indicated in FIGURES 4 and 5. When the indicator 60 is in the empty position as illustrated in FIGURE 4, as the basket pivots inwardly, the indicator crosses over the flat portion 73 and engages the arcuate portion 72 of the frame of the cage 65 and is pivoted slightly counterclockwise as illustrated by the phantom portion of FIGURE 5. However the empty basket is normally prevented from passing from the position shown in FIGURE 4 to the position shown in FIGURE 5 by the stop arm 85 of the latch mechanism 66. Upon inserting a coin into the coin actuating mechanism 66 the basket drops back into the tank to the position shown in FIGURE 5. As the basket drops back into its normal position in the tank the indicator 60 passes under the end of arcuate portion 72. After the basket is in the normal position with the indicator 60 in the empty position it cannot be again raised into the dispensing cage 65 until the indicator has been flipped back to the full position, thus the indicator serves as a stop to assure that an empty basket will not inadvertently be mistaken for a full basket. A stop 131 may be provided on arcuate position 72, if desired.

FIGURE 7 illustrates another embodiment of an indicator and stop. In this embodiment a generally horizontal rod 135 is fixed to the cage 65, preferably by being secured between the uprights 74. An indicator 136 is pivoted between the upper U-shaped frame member 41 of basket 40 by a pivot pin 137 secured at its ends to the frame member 41. In the position shown in the solid lines in FIGURE 7, the indicator is in the "Full" position and the basket 40 is drawn upwardly, the hinged edge of the indicator passes over the inner end of rod 135, and the basket enters the dispensing position after having rotated cocking arm 86 and tab 125 to cock the latching mechanism 66. When the basket 40 is in the dispensing position, the indicator 136 is rotated by gravity, in the manner previously described with reference to indicator 60, into the empty position. As the empty basket 40 again returns to the tank, the indicator 136 being in the empty position, rides over the free end of rod 135. Thereafter the empty basket 40 cannot again be rotated into the dispensing position because the end of rod 135 then engages the indicator in the "Empty" position.

*Operation*

The entire operating cycle of the previously described device is as follows: As the prospective buyer approaches the dispenser he will find the dispensing cage 65 containing an empty basket 40 as shown in FIGURE 6. Upon inserting a coin in the coin hole 90 and then pushing the handle 91 inwardly the stop arm 85 rotates counterclockwise permitting the empty basket 40 to drop back into its normal position within the tank 1. The empty basket 40 is then prevented from being inadvertently pivoted out of the tank 1 by the indicator 60 engaging the stop 131, or the indicator 136 engaging the rod 135. With the basket 40 back in the tank the closure 25 may be rotated with respect to the tank 1 until the dispensing cage 65 is directly over a full basket containing the desired size and type of live bait. The buyer then reaches through the opening defined by frame 69 and grasps the eye 56 and proceeds to pivot the full basket 40 up into the dispensing cage 65. The indicator 60 is in the "Full" position, and does not engage the stop 131. As the full basket 40 is pivoted through the dispensing cage 65 the basket arm 55 engages the cocking arm 86 rotating the arms clockwise. The upper end of the basket front wall 43 passes over the inner end of the lip 82 on the dispensing spout 68 and the live bait is poured through the dispensing spout and into a container provided by the buyer. The buyer may of course fill his container with water from the tank through tap 62. When the basket is in the dispensing position indicated in FIGURE 4 the indicator 60 or 136 pivots by gravity from the full position to the empty position. As soon as all of the live bait has been poured from the basket 40, the eye 56 may be released whereupon the basket falls inwardly against the stop arm 85, and the cycle may then be repeated.

In the embodiments illustrated in the drawings and previously described, the device is fabricated substantially from metal. However the precise materials from which the dispenser is fabricated are not of primary importance, for example, the tank 1 might be a wooden tank or a plastic tank, the baskets 40 could be fabricated of a suitable plastic preferably with the members 49 of metal. The closure 25 rotates with respect to the tank 1 but other suitable rotating mountings might be used, for example the closure 25 might run on a track secured to the top of the tank 1. Alternatively, the closure 25 could be fixed and the tank 1 suspended and rotated.

Although this invention has been described with particular reference to certain embodiments, various structural details, certain materials and particular environments, various modifications and additions will be apparent to one skilled in the art, and the invention is therefore not to be limited to such embodiments, materials, details, or environments, except as set forth in the appended claims.

We claim:
1. A dispenser comprising the combination of: a tank having an open upper end, a plurality of containers mounted for movement in a substantially vertical plane from a normal position in said tank to an elevated dispensing position, and latch means to prevent a container from being moved into said dispensing position when said latch means is in a latched position, said latch means re- taining a container in said dispensing position when said latch means is in the latched position, and means to release said latch means from said latched position to permit the last said container to return to said normal position in said tank.

2. In the dispenser of claim 1, said means to release said latch means being coin operated.

3. A dispenser comprising the combination of: a tank having an open upper end, a plurality of containers mounted for movement in a substantially vertical plane from a normal position in said tank to an elevated dispensing position, a cover over said upper end, said cover having an opening for receiving one of said containers as the container is moved into said dispensing position, an indicator on each of said containers for indicating whether said container is full or empty, and means mounting said indicator for movement from the full position to the empty position responsive to movement of the related container into said dispensing position.

4. A dispenser comprising the combination of: a tank having an open upper end, a plurality of containers mounted for movement in a substantially vertical plane from a normal position in said tank to an elevated dispensing position, and stop means on each of said containers to prevent said container from being moved into said dispensing position after said container has been moved from said dispensing position to said normal position.

5. A dispenser comprising a combination of: a tank having an open upper end, a plurality of containers mounted for movement with respect to said tank in a substantially vertical plane from a normal position in said tank to an elevated dispensing position, an indicator and stop means on each of said containers to indicate whether the container is full or empty and to prevent the container from being moved into said dispensing position after the container had been moved from said dispensing position to said normal position.

6. A dispenser comprising a combination of: a tank having an open upper end, a plurality of containers mounted for movement with respect to said tank in a vertical plane from a normal position in said tank to an elevated dispensing position, a cover over said open end, said cover having an opening for receiving one of said containers as the container is moved into said dispensing position, said cover being movable for selective positioning of said opening over any of said containers, and latch means to prevent a container from being moved into said dispensing position when said latch means is in a latched position, said latch means comprising a first member for retaining a container in said opening when said latch means is in said latched position, coin operated means to release said latch means from said latched position to permit said first member to release the container in said opening for movement of the last said container into said normal position in said tank, and a second member responsive to movement of a container into said dispensing position in said opening to return said latch means to said latched position.

7. A dispenser comprising the combination of: a tank having a substantially horizontal open upper end, a plurality of containers mounted for movement with respect to said tank in a substantially vertical plane from a normal position in said tank to an elevated dispensing position, said containers having upper peripheral edges entirely above the peripheral edge of said tank when said containers are in said normal position, a cover over said open end, said cover having an opening for receiving one of said containers in said dispensing position, said cover being movable for selective positioning of said opening over any of said containers, and latch means to prevent a container from being moved into said dispensing position when said latch means is in a latched position, said latch means retaining a container in said opening when said latch means is in said latched position, and means to release said latch means from said latched position to permit the last said container to return to said normal position in said tank, and indicator and stop means on each of said containers for indicating whether said container is full or empty and to prevent said container from being moved into said dispensing position after said container has been moved from said dispensing position to said normal position.

8. An aquatic animal dispenser comprising the combination of: a water holding tank having an open upper end, a plurality of perforate containers mounted for movement with respect to said tank in a substantially vertical plane between a normal position in said tank for the passage of water from the tank into said containers and an elevated dispensing position, a cover movably mounted with respect to said tank over said open end, said cover having an opening removably receiving one of said containers as the container is moved into said dispensing position, said cover being movable for selective positioning of said opening over any of said containers for selection of a desired container of aquatic animals, and means for releasably holding a container in dispensing position in said opening to prevent movement of said cover over said containers.

9. A live aquatic animal dispenser comprising a combination of: a water holding tank having an open upper end, a plurality of perforate containers for holding live aquatic animals, said containers being mounted for movement with respect to said tank in a vertical plane from a normal position in said tank for the passage of water in said tank into said containers to an elevated dispensing position, a cover over said open end, said cover having an opening for receiving one of said containers as the container is moved into said dispensing position, said cover being movably mounted with respect to said tank for selective positioning of said opening over any of said containers for selection of a desired container of aquatic animals, and latch means to prevent a container from being moved into said dispensing position when said latch means is in a latched position, said latch means comprising a first member for retaining a container in said opening when said latch means is in said latched position, coin operated means for releasing said latch means from said latched position to permit said first member to release the container in said opening for movement of the last said container into said normal position in said tank, and a second member responsive to movement of a container into said dispensing position in said opening to return said latch means to said latched position.

10. A live aquatic animal dispenser comprising the combination of: a water holding tank having an open upper end, a plurality of perforate containers for holding live aquatic animals, said containers being mounted for pivotal movement with respect to said tank in a substantially vertical plane between a normal position in said tank for the passage of water from the tank into said containers and an elevated dispensing position, a cover over said open end, said cover having an opening for receiving one of said containers in said dispensing position, said cover being rotatably mounted with respect to said tank for selectively positioning said opening over any of said containers for selection of a desired container of aquatic animals, and means on each of said containers for indicating whether said container is full or empty and to prevent said container from being moved into said dispensing position after said container has been moved from said dispensing position to said normal position.

11. A live aquatic animal dispenser comprising the combination of: a water holding tank having an open upper end, a plurality of perforate containers for holding live aquatic animals, said containers being mounted for pivotal movement with respect to said tank in a substantially vertical plane between a normal position in said tank for the passage of water from the tank into said container and an elevated dispensing position, a cover over said open end, said cover having an opening for receiving one of said containers in said dispensing position, said cover being rotatably mounted with respect to said tank for selectively positioning said opening over any of said containers for selection of a desired container of aquatic animals, latch means to prevent a container from being moved into said dispensing position when said latch means is in a latched position, said latch means retaining a container in said opening when said latch means is in said latched position, and means to release said latch means from said latched position to permit the last said container to return to said normal position in said tank, and indicator and stop means on each of said containers for indicating whether said container is full or empty and to prevent said container from being moved into said dispensing position after said container has been moved from said dispensing position to said normal position.

12. An acquatic animal dispenser comprising the combination of: a water holding tank having an open upper end, a plurality of perforate containers for holding aquatic animals and operatively secured within said tank for back and forth movement between a normal position in the tank for the passage of water from the tank into said containers and an elevated dispensing position, a cover having an opening for removably receiving a container as the last said container moves to dispensing position, means mounting said cover over said open end for movement of said opening into position over any of said containers, and means including a container normally releasably holding said cover against said movement and operable for releasing said cover for movement at random to position said opening over any selected one of said containers so that one of said containers selected at random may be moved to dispensing position.

13. A dispenser for aquatic animals comprising the combination of: a tank having an open upper end defined by a peripheral upper edge of said tank, a plurality of aquatic animal containers in said tank, means operatively permanently attaching said containers to said tank and pivotally mounting said containers on said edge for swinging movement from a normal position in said tank to an elevated dispensing position extending above said edge, a cover over said open end and normally preventing movement of said containers to dispensing position, said cover having an opening for receiving a container as the container moves to dispensing position, and means mounting said cover for selective movement of said opening to any desired operative position for receiving at random a selected one of said containers.

14. A dispenser for aquatic animals comprising the combination of: a tank including an upright wall portion and an open upper end, a plurality of containers for aquatic animals in said tank, means pivotally mounting and operatively permanently attaching said containers on said upright wall portion of said tank for swinging movement from a normal position in said tank to an elevated dispensing position above said tank, a cover over said open end and normally preventing movement of said containers to dispensing position, said cover having an opening for receiving a container as the container moves to dispensing position, and means mounting said cover for selective movement of said opening to any desired operative position for receiving at random a selected one of said containers.

15. A dispenser comprising the combination of: a covered receptacle having an upper end and including a tank having an open upper end and a cover movable over said open upper end, dispenser outlet means at the upper end of said receptacle, a plurality of containers mounted for movement between a normal position in said tank and an elevated dispensing position cooperating with said dispenser outlet means, and cooperating stop means on said cover and said containers to prevent each container from being moved into said dispensing position after it has been moved from said dispensing position to said normal position.

16. A dispenser comprising the combination of: a tank having an open upper end, a plurality of containers mounted for movement between a normal position in said tank and an elevated dispensing position, a cover movably mounted over said tank open upper end and having an opening positionable over said containers and receiving a container as the last said container moves to dispensing position, an abutment on said cover, stop members, one for each of said containers; and means mounting each stop member on the respective container for movement from a first position to another position as the respective container moves from normal position to dispensing position and for movement in the other position past said abutment as the container moves back to normal position, and when in said other position said member engaging said abutment upon movement of said container from normal position toward dispensing position to hold the container against movement to dispensing position.

17. The dispenser of claim 16, and indicator means including said stop members indicating the respective containers to be full in said first position and empty in said other position.

References Cited in the file of this patent
UNITED STATES PATENTS

| | | |
|---|---|---|
| 1,602,187 | Cutler | Oct. 5, 1926 |
| 1,741,728 | Nemeth | Dec. 31, 1929 |
| 2,310,072 | Fry | Feb. 2, 1943 |
| 2,668,090 | Derr | Feb. 2, 1954 |
| 2,908,105 | Rogers | Oct. 13, 1959 |
| 2,920,735 | Sims | Jan. 12, 1960 |